(12) United States Patent
Burke (10) Patent No.: US 10,347,102 B2
(45) Date of Patent: Jul. 9, 2019

(54) METHOD AND SYSTEM FOR SURVEILLANCE CAMERA ARBITRATION OF UPLINK CONSUMPTION

(71) Applicant: Sensormatic Electronics, LLC, Boca Raton, FL (US)

(72) Inventor: Anthony Burke, Noblesville, IN (US)

(73) Assignee: Sensormatic Electronics, LLC, Boca Raton, FL (US)

(*) Notice: Subject to any disclaimer, the term of this patent is extended or adjusted under 35 U.S.C. 154(b) by 24 days.

(21) Appl. No.: 15/076,701

(22) Filed: Mar. 22, 2016

(65) Prior Publication Data

US 2017/0278368 A1 Sep. 28, 2017

(51) Int. Cl.
*H04N 7/18* (2006.01)
*G08B 13/196* (2006.01)

(52) U.S. Cl.
CPC . *G08B 13/19669* (2013.01); *G08B 13/19656* (2013.01); *H04N 7/181* (2013.01)

(58) Field of Classification Search
CPC .............................................. G08B 13/19669
USPC ....................................................... 348/143
See application file for complete search history.

(56) References Cited

U.S. PATENT DOCUMENTS

| 3,217,098 A | 11/1965 | Oswald |
| 4,940,925 A | 7/1990 | Wand et al. |
| 5,164,827 A | 11/1992 | Paff |
| 5,204,536 A | 4/1993 | Vardi |
| 5,317,394 A | 5/1994 | Hale et al. |
| 5,729,471 A | 3/1998 | Jain et al. |
| 5,850,352 A | 12/1998 | Moezzi et al. |

(Continued)

FOREIGN PATENT DOCUMENTS

| EP | 2 164 003 A1 | 3/2010 |
| EP | 2 538 672 A1 | 12/2012 |

(Continued)

OTHER PUBLICATIONS

International Search Report and the Written Opinion of the International Searching Authority, dated May 31, 2017, from International Application No. PCT/US2017/023430, filed Mar. 21, 2017. Fourteen pages.

(Continued)

*Primary Examiner* — Leron Beck
(74) *Attorney, Agent, or Firm* — HoustonHogle LLP (57) ABSTRACT

A surveillance camera and image data storage system is disclosed. The system includes surveillance cameras that generate image data. Each of the surveillance cameras calculates a self priority value for uploading the image data and sends its self priority value over a local network to the other surveillance cameras. Within each surveillance camera, a rules engine compares its self priority value and the self priority values from the other surveillance cameras to determine whether to upload the image data over the network to a remote storage system or to save the image data within each surveillance camera. This functions as an arbitration system implemented at the level of the individual cameras to arbitrate uploading of the image data, which limits network bandwidth. In another example, each surveillance camera calculates its self priority value in response to receiving security events from other security devices over a network.

17 Claims, 6 Drawing Sheets

(56) References Cited

U.S. PATENT DOCUMENTS

| | | | |
|---|---|---|---|
| 5,940,538 A | 8/1999 | Spiegel et al. | |
| 5,969,755 A | 10/1999 | Courtney | |
| 6,341,183 B1 | 1/2002 | Goldberg | |
| 6,359,647 B1 | 3/2002 | Sengupta et al. | |
| 6,581,000 B2 | 6/2003 | Hills et al. | |
| 6,724,421 B1 | 4/2004 | Glatt | |
| 6,812,835 B2 | 11/2004 | Ito et al. | |
| 6,970,083 B2 | 11/2005 | Venetianer et al. | |
| 7,091,949 B2 | 8/2006 | Hansen | |
| 7,242,423 B2 | 7/2007 | Lin | |
| 7,286,157 B2 | 10/2007 | Buehler | |
| 7,342,489 B1 | 3/2008 | Milinusic et al. | |
| 7,382,244 B1 | 6/2008 | Donovan et al. | |
| 7,409,076 B2 | 8/2008 | Brown et al. | |
| 7,450,735 B1 | 11/2008 | Shah et al. | |
| 7,456,596 B2 | 11/2008 | Goodall et al. | |
| 7,460,149 B1* | 12/2008 | Donovan | G06F 17/3079 348/143 |
| 7,529,388 B2 | 5/2009 | Brown et al. | |
| 7,623,152 B1* | 11/2009 | Kaplinsky | G06T 7/254 348/155 |
| 7,623,676 B2 | 11/2009 | Zhao et al. | |
| 7,733,375 B2 | 6/2010 | Mahowald | |
| 8,249,301 B2 | 8/2012 | Brown et al. | |
| 8,300,102 B2 | 10/2012 | Nam et al. | |
| 8,325,979 B2 | 12/2012 | Taborowski et al. | |
| 8,482,609 B1 | 7/2013 | Mishra et al. | |
| 8,483,490 B2 | 7/2013 | Brown et al. | |
| 8,502,868 B2 | 8/2013 | Buehler et al. | |
| 8,594,482 B2 | 11/2013 | Fan et al. | |
| 8,675,074 B2 | 3/2014 | Salgar et al. | |
| 8,723,952 B1 | 5/2014 | Rozenboim | |
| 8,995,712 B2 | 3/2015 | Huang et al. | |
| 9,015,167 B1* | 4/2015 | Ballou | G06F 17/30321 707/741 |
| 9,058,520 B2 | 6/2015 | Xie et al. | |
| 9,094,615 B2 | 7/2015 | Aman et al. | |
| 9,129,179 B1* | 9/2015 | Wong | G06K 9/20 |
| 9,158,975 B2 | 10/2015 | Lipton et al. | |
| 9,168,882 B1* | 10/2015 | Mirza | B60R 16/037 |
| 9,197,861 B2 | 11/2015 | Saptharishi et al. | |
| 9,280,833 B2 | 3/2016 | Brown et al. | |
| 9,412,269 B2 | 8/2016 | Saptharishi et al. | |
| 9,495,614 B1 | 11/2016 | Boman et al. | |
| 9,594,963 B2 | 3/2017 | Bobbitt et al. | |
| 9,641,763 B2 | 5/2017 | Bernal et al. | |
| 9,674,458 B2* | 6/2017 | Teich | H04N 5/2354 |
| 9,785,898 B2* | 10/2017 | Hofman | G06Q 10/06315 |
| 9,860,554 B2 | 1/2018 | Samuelsson et al. | |
| 9,965,680 B2 | 5/2018 | Burke et al. | |
| 9,967,446 B2 | 5/2018 | Park | |
| 2002/0104098 A1* | 8/2002 | Zustak | H04N 7/17318 725/131 |
| 2003/0107649 A1 | 6/2003 | Flickner et al. | |
| 2003/0169337 A1 | 9/2003 | Wilson et al. | |
| 2005/0012817 A1* | 1/2005 | Hampapur | H04N 7/181 348/143 |
| 2005/0057653 A1 | 3/2005 | Maruya | |
| 2006/0001742 A1 | 1/2006 | Park | |
| 2006/0181612 A1 | 8/2006 | Lee et al. | |
| 2006/0239645 A1 | 10/2006 | Curtner et al. | |
| 2006/0243798 A1 | 11/2006 | Kundu et al. | |
| 2007/0178823 A1 | 8/2007 | Aronstam et al. | |
| 2007/0182818 A1 | 8/2007 | Buehler | |
| 2007/0279494 A1 | 12/2007 | Aman et al. | |
| 2007/0294207 A1 | 12/2007 | Brown et al. | |
| 2008/0004036 A1 | 1/2008 | Bhuta et al. | |
| 2008/0101789 A1 | 5/2008 | Sharma | |
| 2008/0114477 A1 | 5/2008 | Wu | |
| 2008/0158336 A1 | 7/2008 | Benson et al. | |
| 2009/0237508 A1 | 9/2009 | Arpa et al. | |
| 2009/0268033 A1 | 10/2009 | Ukita | |
| 2009/0273663 A1 | 11/2009 | Yoshida | |
| 2009/0284601 A1 | 11/2009 | Eledath et al. | |
| 2010/0013917 A1 | 1/2010 | Hanna et al. | |
| 2010/0110212 A1 | 5/2010 | Kuwahara et al. | |
| 2010/0153182 A1 | 7/2010 | Quinn et al. | |
| 2011/0043631 A1 | 2/2011 | Marman et al. | |
| 2011/0128384 A1 | 6/2011 | Tiscareno et al. | |
| 2011/0246626 A1* | 10/2011 | Peterson | G06F 9/4416 709/220 |
| 2011/0289417 A1 | 11/2011 | Schaefer et al. | |
| 2012/0072420 A1 | 3/2012 | Moganti et al. | |
| 2012/0206605 A1 | 8/2012 | Buehler et al. | |
| 2012/0226526 A1 | 9/2012 | Donovan et al. | |
| 2013/0166711 A1 | 6/2013 | Wang et al. | |
| 2013/0169801 A1 | 7/2013 | Martin et al. | |
| 2013/0223625 A1 | 8/2013 | de Waal et al. | |
| 2013/0278780 A1 | 10/2013 | Cazier et al. | |
| 2013/0343731 A1 | 12/2013 | Pashkevich et al. | |
| 2014/0085480 A1 | 3/2014 | Saptharishi | |
| 2014/0211018 A1 | 7/2014 | de Lima et al. | |
| 2014/0218520 A1 | 8/2014 | Teich et al. | |
| 2014/0282991 A1 | 9/2014 | Watanabe et al. | |
| 2014/0330729 A1 | 11/2014 | Colangelo | |
| 2015/0039458 A1 | 2/2015 | Reid | |
| 2015/0092052 A1 | 4/2015 | Shin et al. | |
| 2015/0121470 A1 | 4/2015 | Rongo et al. | |
| 2015/0208040 A1 | 7/2015 | Chen et al. | |
| 2015/0215583 A1 | 7/2015 | Chang | |
| 2015/0244992 A1 | 8/2015 | Buehler | |
| 2015/0249496 A1 | 9/2015 | Muijs et al. | |
| 2015/0358576 A1 | 12/2015 | Hirose et al. | |
| 2015/0379729 A1 | 12/2015 | Datta et al. | |
| 2016/0065615 A1 | 3/2016 | Scanzano et al. | |
| 2016/0225121 A1 | 8/2016 | Gupta et al. | |
| 2016/0269631 A1 | 9/2016 | Jiang et al. | |
| 2016/0379074 A1 | 12/2016 | Nielsen et al. | |
| 2017/0193673 A1 | 7/2017 | Heidemann et al. | |
| 2017/0277785 A1 | 9/2017 | Burke | |
| 2017/0277947 A1 | 9/2017 | Burke et al. | |
| 2017/0277967 A1 | 9/2017 | Burke et al. | |
| 2017/0278137 A1 | 9/2017 | Burke | |
| 2017/0278365 A1 | 9/2017 | Madar et al. | |
| 2017/0278366 A1 | 9/2017 | Burke et al. | |
| 2017/0278367 A1 | 9/2017 | Burke et al. | |
| 2017/0280043 A1 | 9/2017 | Burke et al. | |
| 2017/0280102 A1 | 9/2017 | Burke | |
| 2017/0280103 A1 | 9/2017 | Burke et al. | |
| 2018/0218209 A1 | 8/2018 | Burke et al. | |

FOREIGN PATENT DOCUMENTS

| | | |
|---|---|---|
| JP | 2003/151048 A | 5/2003 |
| JP | 2010/074382 A | 4/2010 |
| WO | 2007/030168 A1 | 3/2007 |
| WO | 2013/141742 A1 | 9/2013 |
| WO | 2014/114754 A1 | 7/2014 |

OTHER PUBLICATIONS

International Search Report and the Written Opinion of the International Searching Authority, dated Jun. 12, 2017, from International Application No. PCT/US2017/023440, filed on Mar. 21, 2017. Fourteen pages.

International Search Report and the Written Opinion of the International Searching Authority, dated Jun. 19, 2017, from International Application No. PCT/US2017/023436, filed on Mar. 21, 2017. Fourteen pages.

International Search Report and the Written Opinion of the International Searching Authority, dated Jun. 21, 2017, from International Application No. PCT/US2017/023444, filed on Mar. 21, 2017. Thirteen pages.

International Search Report and the Written Opinion of the International Searching Authority, dated Jun. 28, 2017, from International Application No. PCT/US2017/023434, filed on Mar. 21, 2017. Thirteen pages.

International Preliminary Report on Patentability, dated Oct. 4, 2018, from International Application No. PCT/US2017/023440, filed on Mar. 21, 2017. Eight pages.

(56) References Cited

OTHER PUBLICATIONS

International Preliminary Report on Patentability, dated Oct. 4, 2018, from International Application No. PCT/US2017/023434, filed on Mar. 21, 2017. Eight pages.
International Preliminary Report on Patentability, dated Oct. 4, 2018, from International Application No. PCT/US2017/023430, filed Mar. 21, 2017. Eight pages.
International Preliminary Report on Patentability, dated Oct. 4, 2018, from International Application No. PCT/US2017/023436, filed on Mar. 21, 2017. Eight pages.
International Preliminary Report on Patentability, dated Oct. 4, 2018, from International Application No. PCT/US2017/023444, filed on Mar. 21, 2017. Seven pages.

* cited by examiner

```
//pseudocode snippet of rules for camera 1, installed to capture individuals outside building
start
if (new entry detected in message queue)
    set self priority value to 2
    timeout period = 10 minutes
    if ( movement detected in corridor )
        send image data for analysis to camera analytics system
        if (video primitives generated from camera analytics system indicate that a
              person of interest was detected in the image data)
            set self priority value to 7 for timeout period
        else
            set self priority value to 3
        endif
    endif // end if movement detected in corridor access message queue to obtain self priority values from other surveillance cameras
    if ( self priority value > self priority values from other surveillance cameras)
        upload image data to cloud storage system in accordance with site profile
    else
        store image data locally to camera image data storage system
    endif
    send self priority value in a message to the other surveillance cameras
endif
goto start
```

FIG. 5A

```
//pseudocode snippet of rules for camera 2, installed above a cash register at a point of sale area
start
if (new entry detected in message queue )
    timeout period = 5 minutes
    updateSelfPriorityValue()
    if (cash register drawer opened)   //indicates drawer is open
        set self priority value to 7 for timeout period
    then
        updateSelfPriorityValue()
    endif access message queue to obtain self priority values from other surveillance cameras
    if ( self priority value > self priority values from other surveillance cameras)
        upload image data to cloud storage system
    else
        store image data locally to camera image data storage system
    endif
    send self priority value in a message to the other surveillance cameras
endif
goto start
updateSelfPriorityValue ( )    // helper method
    if (8am < current time < 5 pm) set self priority value to 3 else (set self priority value to 2)
    return
```

FIG. 5B

```
146-3                                                          274-3
         1000-4
        //pseudocode snippet of rules for camera 3, installed outside a safe
        start
        if (new entry detected in message queue )
                set self priority value to 7              160-12
                timeout period = 10 minutes
                if ( movement detected near safe)         270-2-1
                        set self priority value to 8 for timeout period
  1006-3        then
                        set self priority value to 3
                endif
                if (safe door relay activated)   //indicates safe is open
                        set self priority value to 10
                endif access message queue to obtain self priority values from other surveillance cameras
                if ( self priority value > self priority values from other surveillance cameras)
                        upload image data to cloud storage system
  1008-3        else
                        store image data locally to camera image data storage system
                endif
                send self priority value in a message to the other surveillance cameras
        endif
        goto start      1002-3
```

//pseudocode snippet of rules for camera 4, installed near an exit door
        start      1000-4
        if (new entry detected in message queue )
                set self priority value to 3      160-13
                timeout period = 2 minutes
                if ( movement detected near door )
                        set self priority value to 7 for timeout period
  1006-4        then
                        set self priority value to 3
                endif access message queue to obtain self priority values from other surveillance cameras
                if ( self priority value > self priority values from other surveillance cameras)
                        upload image data to cloud storage system
  1008-4        else
                        store image data locally to camera image data storage system
                endif
                send self priority value in a message to the other surveillance cameras
        endif
        goto start    1002-4
```

FIG. 5D

METHOD AND SYSTEM FOR SURVEILLANCE CAMERA ARBITRATION OF UPLINK CONSUMPTION

RELATED APPLICATIONS

This application is related to:

U.S. application Ser. No. 15/076,703 filed on Mar. 22, 2016, entitled "Method and system for pooled local storage by surveillance cameras," now U.S. Patent Publication No. US2017/0280102A1;

U.S. application Ser. No. 15/076,704 filed on Mar. 22, 2016, entitled "System and method for designating surveillance camera regions of interest," now U.S. Patent Publication No. US2017/0277967A1;

U.S. application Ser. No. 15/076,705 filed on Mar. 22, 2016, entitled "System and method for deadzone detection in surveillance camera network," now U.S. Patent Publication No. US2017/0278366A1;

U.S. application Ser. No. 15/076,706 filed on Mar. 22, 2016 entitled "System and method for overlap detection in surveillance camera network," now U.S. Patent Publication No. US2017/0278367A1;

U.S. application Ser. No. 15/076,708 filed on Mar. 22, 2016, entitled "System and method for retail customer tracking in surveillance camera network," now U.S. Patent Publication No. US2017/0278137A1;

U.S. application Ser. No. 15/076,709 filed on Mar. 22, 2016, entitled "Method and system for modeling image of interest to users," now U.S. Patent Publication No. US2017/0277785A1;

U.S. application Ser. No. 15/076,710 filed on Mar. 22, 2016, entitled "System and method for using mobile device of zone and correlated motion detection," now U.S. Patent Publication No. US2017/280103A1;

U.S. application Ser. No. 15/076,712 filed on Mar. 22, 2016, entitled "Method and system for conveying data from monitored scene via surveillance cameras," now U.S. Patent Publication No. US2017/0277947A1;

U.S. application Ser. No. 15/076,713 filed on Mar. 22, 2016, entitled "System and method for configuring surveillance cameras using mobile computing devices," now U.S. Patent Publication No. US2017/0278365A1; and U.S. application Ser. No. 15/076,717 filed on Mar. 22, 2016, entitled "System and method for controlling surveillance cameras," now U.S. Patent Publication No. US2017/0280043A1.

All of the afore-mentioned applications are incorporated herein by this reference in their entirety.

BACKGROUND OF THE INVENTION

Historically, surveillance camera systems were often proprietary/closed-standards systems. Surveillance cameras were directly wired to a local video storage system and the image data from the cameras were compiled into matrix views for real time viewing at possibly a security guard station or back office video monitor. Each camera typically required significant installation time and adjustment because of their "hard wired" connection. In addition, the local video storage system was typically a video cassette recorder (VCR) located in a network room or the back office within the premises being monitored.

More recently, internet protocol (IP) surveillance cameras have become increasingly common. These cameras utilize standard protocols over wired and/or wireless networks. Operators can often control and send many of the setup parameters over the networks. The captured image data is sent for storage in possibly a local network video recording (NVR) system, which may also distribute the image data for display on desktop or mobile devices.

At the same time, the trend has been to utilize remote cloud image data storage systems for storing image data from surveillance cameras. While the surveillance cameras are typically purchased by the organizations and mounted within their premises, the storage of the image data will often be leased from a service provider. Such a solution can be attractive to smaller organizations such as stores, small companies, and local offices that want to reduce installation and maintenance expenses. Operations upon the image data such as retrieval of previously recorded video can also be provided as part of the service.

Remote cloud image data storage systems offer a number of advantages over local image data storage systems. Because the storage provided by these systems is located remotely to the premises being managed, organizations utilizing remote storage systems as part of their surveillance camera systems have fewer components to buy and install, which lowers both purchase and depreciation cost. Organizations can also pay on a per usage basis for infrequently used value-added services. Finally, the service providers of the cloud storage systems bear the responsibility of maintaining and upgrading the storage systems and their capabilities, the cost of which the service providers can share across their managed clients.

SUMMARY OF THE INVENTION

One problem arises from how conventional surveillance camera systems will consume the bandwidth of the uplink to a cloud storage system. It is not uncommon for the camera systems to crowd-out other systems competing for access to remote networks and systems.

The present invention concerns a system for enabling surveillance cameras to arbitrate uploading of the image data to remote storage systems. The arbitration can take into account priorities assigned among the cameras and the priorities can change dynamically based on information gained by and/or provided to the cameras. The arbitration can further account for other factors such as profiles governing how available bandwidth should be allocated between the surveillance cameras individually or as a whole and other business priorities.

In general, according to one aspect, the invention features a surveillance camera and image data storage system. The system comprises surveillance cameras generating image data and a storage system that is remote from the surveillance cameras. An arbitration system is used that enables the surveillance cameras to arbitrate uploading of the image data by the surveillance cameras to the storage system.

In one example, the arbitration system includes a rules engine, possibly for each of the surveillance cameras, that calculates a self priority value for uploading the image data for each of the surveillance cameras. The rules engine for each of the cameras can then determine whether to upload or locally store the image data based on the self priority value and self priority values of the other surveillance cameras.

The arbitration system can also include a messaging engine for each of the surveillance cameras that shares self priority values of each of the surveillance cameras.

Further, the surveillance cameras can include camera analytics systems that analyze the image data from each of the surveillance cameras. The surveillance cameras can then calculate self priority values in response to the analysis of the image data.

In the current embodiment, each of the surveillance cameras further includes a camera image data storage system for locally storing the image data.

In general, according to another aspect, the invention features a method for storing image data from surveillance cameras. The method comprises surveillance cameras generating image data and the surveillance cameras arbitrating uploading of the image data to a storage system that is remote from the surveillance cameras.

Preferably, each of the surveillance cameras calculates a self priority value for uploading the image data for each of the surveillance cameras and each of the surveillance cameras further exchange the calculated self priority value with the other surveillance cameras. Then, each of the surveillance cameras can determine whether to upload or locally store the image data based on the self priority value and self priority values of the other surveillance cameras.

In general, according to another aspect, the invention features a surveillance camera comprising local image data storage, a network interface for accessing remote image data storage, and a rules engine for determining whether to store image data generated by the surveillance camera to the local image data storage or to the remote image data storage.

In general, according to still another aspect, the invention features an image data storage method for a surveillance camera. This method comprises receiving priority values from other surveillance cameras and determining whether to store image data generated by the surveillance camera to local image data storage or to the remote image data storage based on the received priority values.

Preferably, the priority values are exchanged with other surveillance cameras. In addition, a rules engine can determine whether to store the image data generated to the local image data storage or to the remote image data storage in response to the priority values from other surveillance cameras. Further, the rules engine can determine whether to store the image data to the local image data storage or to the remote image data storage in response to a site profile and/or analysis of the image data.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIGS. 5A-5D show exemplary pseudocode for rules within a rules engine portion of the arbitration system of different surveillance cameras, where the rules calculate a self priority value for determining whether each surveillance camera should store its image data locally or upload its image data to the cloud storage system.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms including the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
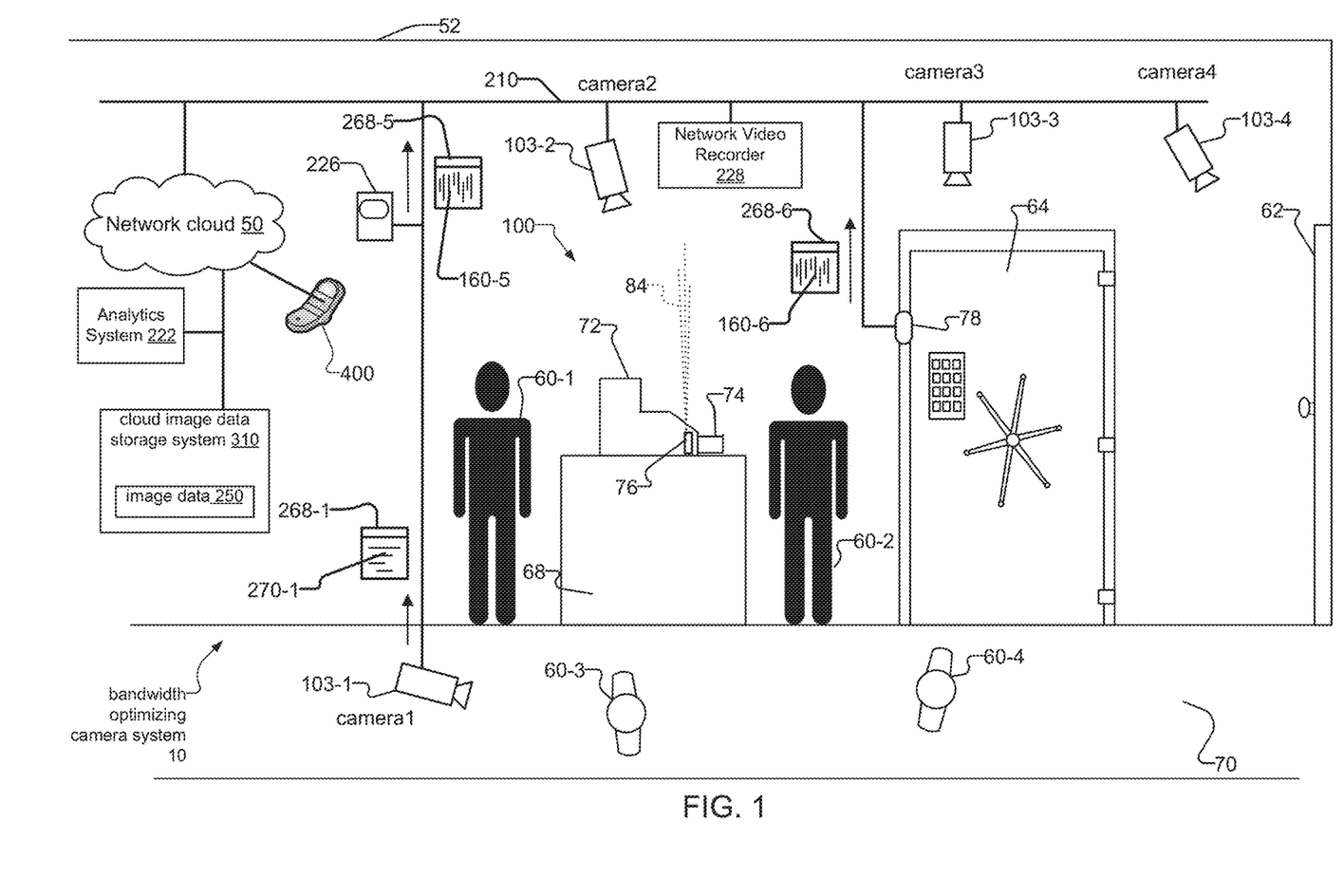
FIG. 1 is a schematic diagram showing a network of surveillance cameras installed at a client premises that store image data locally and to a cloud storage system.

FIG. 1 shows an exemplary surveillance camera and image data storage system 10 to which the present invention is applicable.

The system 10 includes surveillance cameras 103 and other security devices such as sensor devices installed at a premises 52 of an organization.

The surveillance cameras 103 communicate with each other and with the security devices over a local network 210. Surveillance cameras with reference numbers 103-1 through 103-4 are associated with cameras "camera1" through "camera4," respectively. Other security devices located on the network 210 include a network video recorder 228 and sensor devices such as motion detectors 226, an LED light 76, and relays or contact switches 78, in examples.

The surveillance cameras 103 generate image data 250, and then locally store the image data and/or upload streams of image data 250 over a network cloud 50 to a cloud or remote image data storage system 310. The image data 250 can then be accessed over the network cloud 50 by user mobile computing devices 400 such as smartphones, tablet computing devices, laptop computer running operating systems such as Windows, Android, Linux, or IOS, in examples.

A specific example showing how the cameras might be deployed is illustrated. Within the premises 52, camera1 103-1 focuses upon persons 60-3 and 60-4 located within an aisle or sidewalk 70 adjacent to the premises 52. Camera2 103-2 focuses upon a point of sale area 100 within the premises 52. The point of sale area 100 includes a cash register or point of sale terminal 72 located on top of a desk 68. LED light 76 included within a drawer 74 of the point of sale terminal 72 emits a light beam 84 when the drawer 74 is opened. Camera3 103-3 captures image data and detects motion near a safe 64. Finally, camera4 103-4 detects motion of individuals 60 near a door 62 providing entry to or exit from the premises 52.

Security devices such as the surveillance cameras 103 and the sensor devices also generate and send event data 160 in response to security events detected within the system 10. These security events include changes in the environment that the security devices were designed to detect, such as a when a window sensor detects that the window has been opened or that the window sensor itself has been tampered with, and when a contact switch 78 detects that a door of a safe 64 has been opened, in examples. In another example, camera2 103-2 detects light beam 84 signals sent from the LED light 76 in response to an employee individual 60-2 opening the drawer 74 of the point of sale terminal 72. In response to camera2 detecting the light beam 84, camera2 generates and stores event data 160 for a "cash register drawer" security event. In yet another example, in response to detecting motion of individuals 60-1 and 60-2, motion detector 226 can send message 268-5 over the network 210 to the surveillance cameras 103. The message 268-5 includes event data 160-5 associated with the detected motion security event.

An important feature concerns how the surveillance cameras 103 operate in a distributed and self-organized fashion to share bandwidth and limit utilization of the network 210 when uploading streams of image data 250 to the cloud storage system 310, for example. Specifically, a distributed arbitration system is employed in which each of the surveillance cameras 103 calculates a self priority value 270 for the image data 250 of each of its streams, and includes the self priority value 270 in a message 268 transmitted over the local network 210 to the other surveillance cameras 103. In one example, message 270-1 transmitted from camera1 103-1 includes self priority value 268-1. Each of the cameras 103 receives message from all of the other cameras. In the specific case illustrated, as camera4 103-4 receives the message 270-1 and processes the self priority value 268-1 included within the message 270-1. In this way, each of the surveillance cameras 103 can "learn" or detect the highest priority streams of image data 250 of the other cameras 103 and prioritize uploading of its streams of image data 250 in response.

Each surveillance camera 103 calculates its self priority value 270 for the image data 250 of each of its streams, in one example, in response to event data 160 generated by the security devices. In one example, camera1 103-1 generates and saves event data 160-5 in response to detecting persons 60-3 and 60-4 in the corridor 70, and can send the event data 160-5 in message 268-5 to the other surveillance cameras 103-2 through 103-4. Each of the other surveillance cameras 103-2 through 103-4 can then process the message 268-5 and calculate its self priority value 270 for the image data 250 in response to the event data 160-5 included within the message 268-5. In another example, contact switch 78 sends a message 268-6 including event data 160-6 over the local network 210 in response to detecting a door opening or tampering event for the safe 64. Because camera3 103-3 was installed to monitor an area near the safe 64, camera3 103-3 calculates its self priority value 270 in response to the event data 160-6 associated with the safe 64 included within the received message 268-6.

Figure 2:
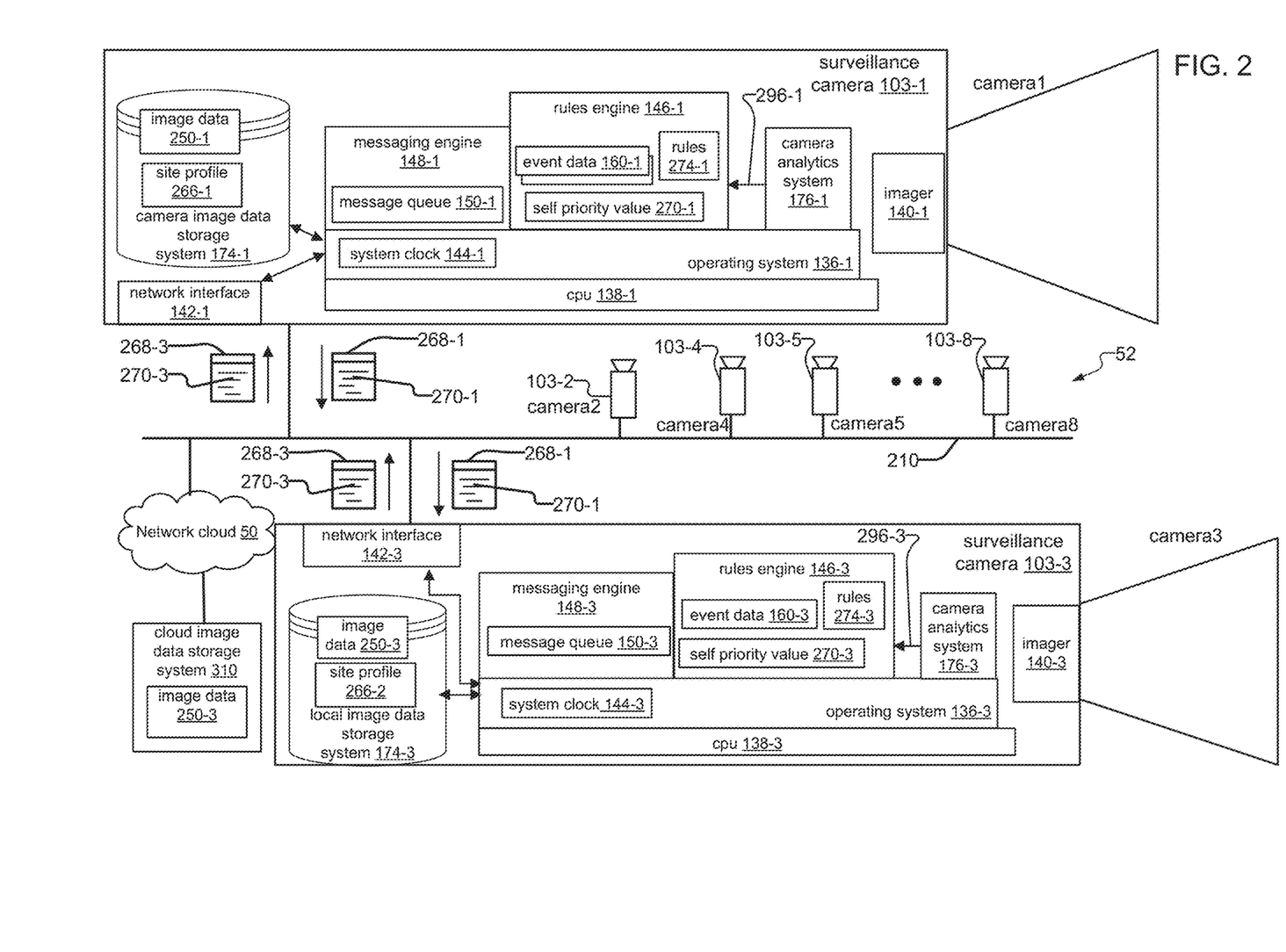
FIG. 2 is a schematic diagram showing some of the components of the surveillance cameras.

FIG. 2 shows some of the components of surveillance cameras such as camera1 103-1 and camera3 103-3.

By way of overview, in the illustrated example, each of the cameras 103 include a processing unit (CPU) 138, an imager 140, a camera image data storage system 174 and a network interface 142. An operating system 136 runs on top of the CPU 138. The operating system 136 includes a system clock 144 for generation and comparison of timestamps of image data 250, in one example. A number of processes or applications are executed by the operating system 136. The processes include a messaging engine 148, a rules engine 146, and an optional camera analytics system 176. The camera image data storage system 174 includes image data 250 and a site profile 266. The site profile 266 specifies a predetermined cap or maximum amount of network bandwidth of the local network 210 that each of the surveillance cameras 103 can cumulatively utilize at different times of each day and different days of the week.

The arbitration system is preferably a distributed system applying rules and exchanging messages that is implemented at the level of the individual surveillance cameras 103 and operates collectively across all surveillance cameras 103 in the local network 210. The messaging engine 148 and rules engine 146 processes implement the arbitration system at the level of the individual surveillance cameras 103. The rules engine 146 calculates a self priority value 270 for uploading the image data 250 for each of the surveillance cameras 103. The messaging engine 148 shares the self priority values 270 of each of the surveillance cameras 103 with the other surveillance cameras 103.

Within each surveillance camera 103, the rules engine 146 portion of the arbitration system accepts multiple inputs such as the time of day from the system clock 144, event data 160 generated by the security devices in response to events, and video primitives 296. The camera analytics system 176 generates the video primitives 296 in response to analyzing the image data 250 such as meta data when a user crosses a tripwire for example. The rules engine 146 receives and stores event data 160 sent in messages 268 from security devices, and generates event data 160 in response to detecting signals sent from the security devices, in examples.

In one implementation of the arbitration system, operators configure each surveillance camera 103 to include a different predetermined self priority value 270 for uploading the image data. This basic implementation assures that only one surveillance camera 103 (typically the camera or cameras 103 having the highest self priority value 274) can upload its/their image data 250 at any given time.

In a preferred implementation of the arbitration system, operators define rules 274 executed by the rules engine 146 of each surveillance camera 103 to determine the self priority value 270 of each surveillance camera 103. In examples, the rules 274 reference event data 160 and/or video primitives 296 generated from the image data 250. In one example, event data 160 and/or video primitives 296 associated with higher priority security objectives preferably increase the self priority value 270. In a similar vein, absence of event data 160 and/or video primitives 296, or event data 160 and/or video primitives 296 associated with lower priority security objectives, correspondingly decrease the self priority value 270 of the associated surveillance camera 103. Inter-camera communication for the arbitration system is accomplished by the messaging engine 148 portion of the arbitration system. The messaging engine 148 of each surveillance camera 103 transmits the self priority value 270 of each surveillance camera 103 in messages 268 to the other surveillance cameras 103. Each surveillance camera 103 then stores the self priority values 270 transmitted from the other surveillance cameras 103 in a message queue 150 within each surveillance camera 103.

The rules engine 148 portion of the arbitration system then determines whether each surveillance camera 103 uploads its image data 250 for remote storage based on the calculated self priority value and the self priority values 270 of the other surveillance cameras 103. Via the rules 274, the rules engine 146 compares the calculated self priority value 270 for the current surveillance camera 103 to the self priority values 270 of the other surveillance cameras 103 stored in the message queue 150. In one implementation, the rules engine 146 specifies that the surveillance camera or cameras 103 having the highest self priority value(s) 270 is/are the surveillance camera(s) 103 designated to upload image data 250 to the cloud storage system 310. All other surveillance cameras 103 store their image data 250 locally to the camera image data storage system 174. The same implementation is applied across each of the surveillance cameras 103, such that only one surveillance camera 103 at any point in time is uploading its image data 250.

When a surveillance camera 103 does upload its image data 250 to the cloud storage system 310, each surveillance camera 103 executes a lookup against its site profile 266 to determine additional "time of day" requirements. Each surveillance camera 103 remotely stores its image data 250 by uploading the image data 250 over the network cloud 50 to the cloud storage system 310 in accordance with the time of day specified in the site profile 266. Finally, the rules 274 provide that the messaging engine 148 of each surveillance camera 103 sends its calculated self priority value 270 in a message 268 to the other surveillance cameras 103.

Figure 3:
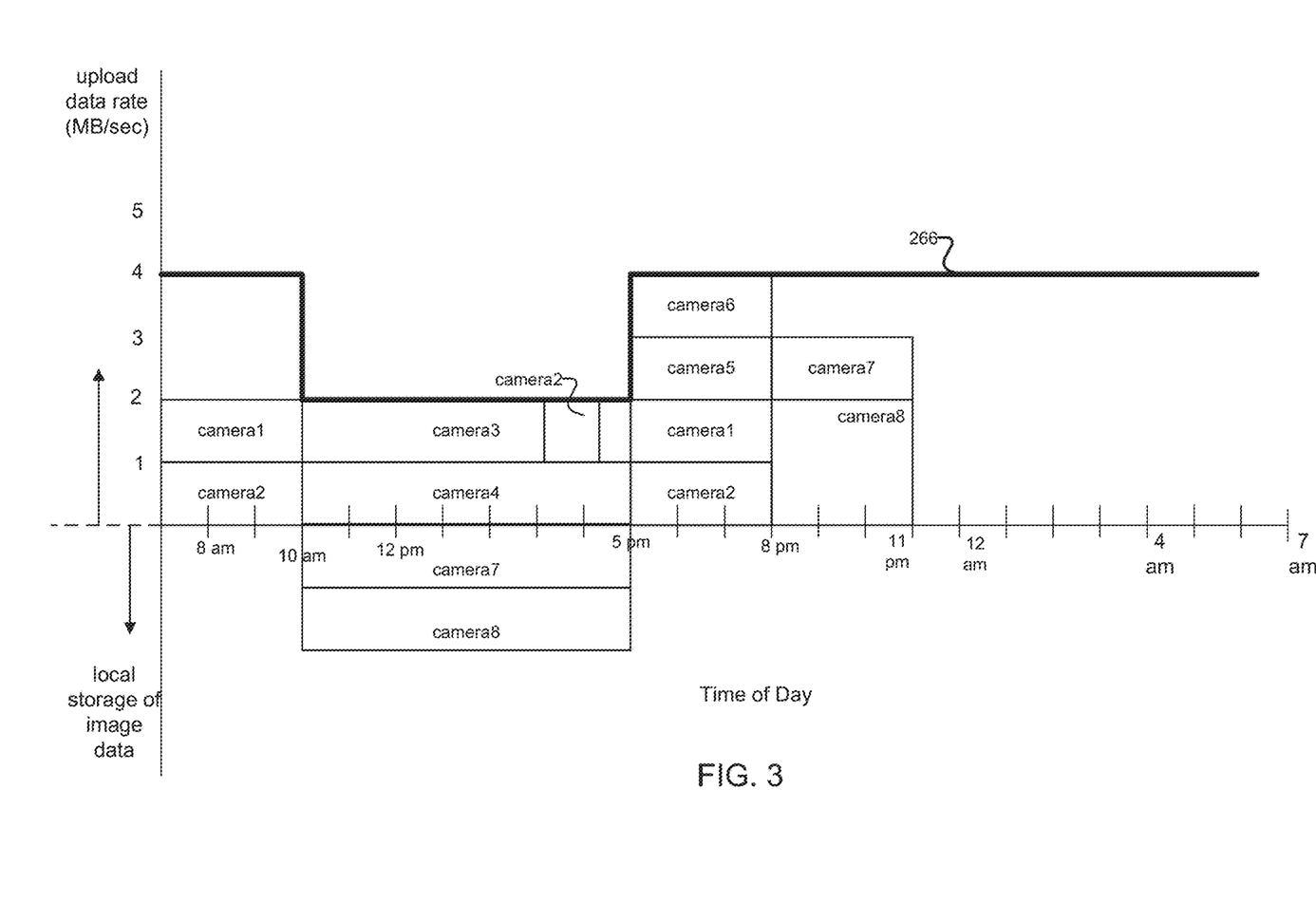
FIG. 3 is a schematic diagram showing allocated and consumed bandwidth over the course of a business day showing fewer higher priority streams of image data being uploaded during business hours and showing more lower priority/higher volume streams of image data being uploaded during off-hours.

FIG. 3 is a schematic diagram showing allocated and consumed bandwidth of the network 210 over the course of a business day for example, in accordance with a site profile 266 of the surveillance cameras 103. The diagram shows fewer, higher priority streams of image data 250 (camera3, camera4, and camera2 displacing camera1's stream) being uploaded during business hours (10 am-5 pm). On the other hand, lower priority streams of image data 250 from camera7 and camera8 are locally stored over the same normal business hours. In addition, the diagram shows more lower priority/higher volume streams of image data 250 being uploaded during off-hours (5 pm-11 pm). In one example, lower priority streams from camera1, camera2, camera5, and camera6 are uploaded between 5 pm and 8 pm. In another example, lower priority streams from camera7 and camera8 are uploaded between 8 pm and 11 pm.

In a preferred implementation, each of the cameras 103 installed at the same site or premises 52 includes a copy of the same site profile 266 as a startup parameter. Typically, the site profile 266 includes a preconfigured list of cameras 103 within the premises 52 and the maximum amount of bandwidth of the local network 210 that all of the cameras 103 may utilize for each time period of workdays and weekends. In another example, an operator can load a first common site profile 266 to the cameras 103 for normal business hour or workday operation, and a second common site profile 266 for weekend operation.

Figure 4:
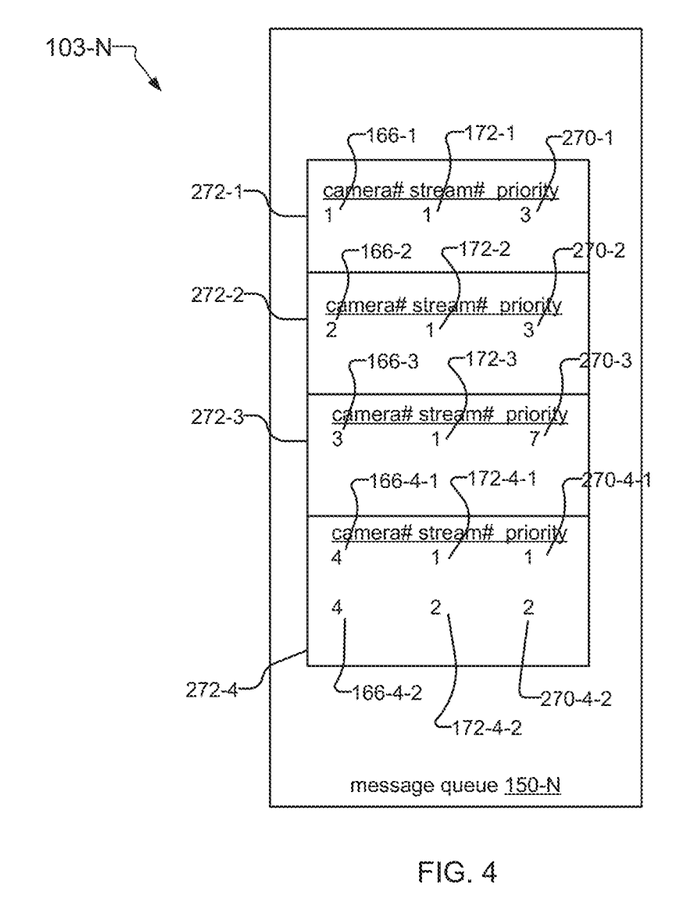
FIG. 4 shows a distributed message queue portion of the arbitration system, the distributed message queue being maintained and employed by the surveillance cameras in order to arbitrate consumption of the allocated bandwidth for the site.

FIG. 4 shows a message queue 150-N maintained by each of the surveillance cameras 103, such as "cameraN" as part of the arbitration system. Entries 272 within the message queue 150-N are stored, where each of the entries 272-1 through 271-4 store contents of messages 268 sent from other surveillance cameras 103-1 through 103-4 (camera1 through camera4, respectively). Entry 272-1 includes a camera number 166-1, stream number 172-1 of image data 250, and self priority value 270-1 for camera1. Entries 272-2 and 272-3 for cameras 2 and 3 include camera number 166-2/166-3, stream number 172-2/172-3, and self priority value 270-2/272-3, respectively. Finally, camera4 supports two streams of image data 250. Associated entry 272-4 for camera4 includes camera number 166-4-1, stream number 172-4-1, and self priority value 270-4-1 for stream 1 of image data 250. In a similar fashion, entry 272-4 for camera4 includes camera number 166-4-2, stream number 172-4-2, and self priority value 270-4-2 for stream 2 of image data 250.

FIG. 5A-5D show, respectively, exemplary pseudocode of rules 274-1 through 274-4 executed by rules engines 146-1 through 146-4 as part of the arbitration system. The rules engines 146-1 through 146-4 are associated with surveillance camera1 through camera4 in FIG. 1. Via its rules 274, the rules engine 146 of each surveillance camera calculates a self priority value 270 in response to event data 160 and/or video primitives 296, and determines whether each camera 103 is designated for uploading its image data 250 based upon the calculated self priority value 270 and the self priority values 270 from other surveillance cameras 103.

In each of the figures, a pseudocode snippet or portion of rules 274 for a main processing loop is shown. The pseudocode illustrates how a rules engine 146 might calculate the self priority value 270 for a surveillance camera 103. The beginning of the loop is indicated by "start" reference 1000-1 through 1000-4 for FIG. 5A-5D, respectively. If the messaging engine 148 detects a new entry 272 in its message queue 150, the rules 274 within the main loop are traversed. Upon conclusion of the main loop, the loop repeats via the "goto start" rule, indicated by reference 1002-1 through 1002-4 in FIG. 5A-5D, respectively.

Then, references 1006-1 through 1006-4 indicate pseudocode of rules 274-1 through 274-4 for calculating the self priority value 270 for each of camera1 through camera4 in FIG. 5A through FIG. 5D, respectively. In a similar vein, references 1008-1 through 1008-4 indicate pseudocode of rules 274-1 through 274-4 that determine ether to upload image data 250 or store it locally within each surveillance camera 103.

FIG. 5A shows exemplary pseudocode of rules 274-1 for rules engine 146-1 of camera1 103-1. Rules section 1006-1 of rules 274-1 for calculating the self priority value 270-1-1 of camera1 103-1 is first traversed. In response to event data 160-10 associated with camera1 having detected motion of persons 60-3 and 60-4 within corridor 70 over a specific time period, the rules 274-1 specify that the rules engine 146-1 send the image data 250 to the camera analytics system 176-1 for analysis.

The rules 274-1 then adjust the self priority value 270-1-1 in response to whether a person of interest was detected in the image data 250, via video primitives 296 generated by the camera analytics system 176-1 in response to the analysis.

After calculating the self priority value 270-1-1, rules section 1008-1 determines whether the current surveillance camera 103-1 is the designated surveillance camera 103 for uploading its image data 250 to the cloud storage system 310. In the implementation, camera1 103-1 uploads its image data 250 only if its self priority value 270-1-1 is greater than the self priority values 270 for each of the other surveillance cameras 103-2 through 103-4. If this statement is true, camera1 103-1 uploads its image data 250 over the local network 250 in accordance with site profile 266-1. Otherwise, camera1 103-1 stores its image data 250 locally to its camera image data storage system 174-1.

FIG. 5B shows exemplary pseudocode of rules 274-2 for rules engine 146-2 of camera2 103-2. Rules section 1006-2 of rules 274-2 for calculating the self priority value 270-2-1 of camera2 103-2 is first traversed. Within section 1006-2, function calls 1010-1 and 1010-2 to a helper method "updateSelfPriorityValue" 1010-3 are specified to calculate the self priority value 270-2-1 in conjunction with the current time, provided by the system clock 144-2. In response to event data 160-11 associated with a "cash drawer opened" event, the self priority value 270-2-1 is increased in value.

After calculating self priority value 270-2-1, in a fashion similar to rules section 1008-1 of FIG. 5A, section 1008-2 of rules 274-2 determines whether the current surveillance camera 103-2 is the designated surveillance camera 103 for uploading its image data 250 to the cloud storage system 310.

FIG. 5C shows exemplary pseudocode of rules 274-3 for rules engine 146-3 of camera3 103-3. Rules section 1006-3 of rules 274-3 for calculating the self priority value 270-2-1 of camera1 is first traversed. Within section 1006-3, in response to event data 160-12 associated with camera3 103-3 detecting movement of individuals 60 near the safe 64, the self priority value 270-3-1 is upwardly adjusted.

After calculating self priority value 270-3-1, in a fashion similar to rules section 1008-1 of FIG. 5A, section 1008-3 of rules 274-3 determines whether the current surveillance camera 103-3 is the designated surveillance camera 103 for uploading its image data 250 to the cloud storage system 310.

FIG. 5D shows exemplary pseudocode of rules 274-4 for rules engine 146-4 of camera4 103-4. Rules section 1006-4 of rules 274-4 for calculating the self priority value 270-4-1 of camera4 103-4 is first traversed. Within section 1006-4, in response to event data 160-13 associated with camera4 103-4 detecting movement of individuals 60 near the door 62, the self priority value 270-4-1 is upwardly adjusted.

After calculating self priority value 270-4-1, in a fashion similar to rules section 1008-1 of FIG. 5A, section 1008-4 of rules 274-4 determines whether the current surveillance camera 103-4 is the designated surveillance camera 103 for uploading its image data 250 to the cloud storage system 310.

While this invention has been particularly shown and described with references to preferred embodiments thereof, it will be understood by those skilled in the art that various changes in form and details may be made therein without departing from the scope of the invention encompassed by the appended claims.

What is claimed is:

1. A surveillance camera and image data storage system, comprising:
   surveillance cameras generating image data;
   a storage system that is remote from the surveillance cameras; and
   an arbitration system used by the surveillance cameras to arbitrate uploading the image data by the surveillance cameras to the storage system, the arbitration system including a rules engine for each of the surveillance cameras that calculates a self priority value and determines whether to upload or locally store the image data based on the self priority value and self priority values of the other surveillance cameras;
   wherein the surveillance cameras operate in a distributed and self-organized fashion to share bandwidth and limit utilization of the network when uploading the image data to the storage system, wherein each of the surveillance cameras calculates a self priority value for the image data of each of its streams, and includes the self priority value in messages transmitted to the other surveillance cameras, and each of the cameras receives the messages from all of the other cameras and processes the self priority values included within the messages to detect highest priority streams of image data of all of the surveillance cameras and prioritize uploading of its streams of image data in response.

2. The system of claim 1, wherein the arbitration system includes a messaging engine for each of the surveillance cameras that shares self priority values of each of the surveillance cameras.

3. The system of claim 1, wherein the surveillance cameras include camera analytics systems that analyze the image data from each of the surveillance cameras, and wherein the surveillance cameras calculate the self priority values in response to the analysis of the image data.

4. The system of claim 1, wherein each of the surveillance cameras includes a camera image data storage system for locally storing the image data.

5. The system of claim 1, wherein the storage system is a cloud storage system.

6. A method for storing image data from surveillance cameras, comprising:
   surveillance cameras generating image data;
   each of the surveillance cameras calculating a self priority value for uploading the image data;
   each of the surveillance cameras exchanging the calculated self priority value with the other surveillance cameras; and
   the surveillance cameras arbitrating uploading of the image data to a storage system that is remote from the surveillance cameras by each of the surveillance cameras determining whether to upload or locally store the image data based on its self priority value and self priority values of the other surveillance cameras in which the surveillance cameras operate in a distributed and self-organized fashion to share bandwidth and limit utilization of the network when uploading the image data to the storage system, wherein each of the surveillance cameras calculates a self priority value for the image data of each of its streams, and includes the self priority value in messages transmitted to the other surveillance cameras, and each of the cameras receives the messages from all of the other cameras and processes the self priority values included within the messages to detect highest priority streams of image data of all of the surveillance cameras and prioritize uploading of its streams of image data in response.

7. The method of claim 6, wherein the surveillance cameras calculate the self priority value by analyzing image data.

8. The method of claim 6, wherein the surveillance cameras calculate the self priority value based on signals from security sensors.

9. The method of claim 6, wherein each of the surveillance cameras store its image data to a camera image data storage system within each of the surveillance cameras based on a comparison of a self priority value of each surveillance camera to self priority values of the other surveillance cameras.

10. A surveillance camera, comprising:
local image data storage;
a network interface for accessing remote image data storage; and
a rules engine for determining whether to store image data generated by the surveillance camera to the local image data storage or to the remote image data storage; and
a messaging engine for sending priority values to and receiving priority values from other surveillance cameras;
wherein the surveillance camera operates in a distributed and self-organized fashion with other surveillance cameras to share bandwidth and limit utilization of the network when uploading the image data to the remote image data storage, wherein each of the surveillance cameras calculates a self priority value for the image data of each of its streams, and includes the self priority value in messages transmitted to the other surveillance cameras, and each of the cameras receives the messages from all of the other cameras and processes the self priority values included within the messages to detect highest priority streams of image data of the surveillance cameras and prioritize uploading of its streams of image data in response.

11. A surveillance camera as claimed in claim 10, further comprising the rules engine determining whether to store the image data generated to the local image data storage or to the remote image data storage in response to priority values from other surveillance cameras.

12. A surveillance camera as claimed in claim 10, wherein the rules engine determines where to store image data in response to a site profile.

13. A surveillance camera as claimed in claim 10, wherein the rules engine determines where to store image data in response to analysis of the image data.

14. An image data storage method for a surveillance camera, comprising:
sending priority values to other surveillance cameras;
receiving priority values from the other surveillance cameras; and
a rules engine within the surveillance camera determining whether to store image data generated by the surveillance camera to local image data storage or to remote image data storage based on the received priority values in which the surveillance camera operates in a distributed and self-organized fashion with other surveillance cameras to share bandwidth and limit utilization of the network when uploading the image data to the remote image data storage, wherein each of the surveillance cameras calculates a self priority value for the image data of each of its streams, and includes the self priority value in messages transmitted to the other surveillance cameras, and each of the cameras receives the messages from all of the other cameras and processes the self priority values included within the messages to detect highest priority streams of image data of the surveillance cameras and prioritize uploading of its streams of image data in response.

15. A method as claimed in claim 14, further comprising a rules engine determining whether to store the image data generated to the local image data storage or to the remote image data storage in response to priority values from other surveillance cameras.

16. A method as claimed in claim 14, further comprising a rules engine determining whether to store the image data to the local image data storage or to the remote image data storage in response to a site profile.

17. A method as claimed in claim 14, further comprising a rules engine determining whether to store the image data to the local image data storage or to the remote image data storage in response to analysis of the image data.

* * * * *